(12) United States Patent
Garg et al.

(10) Patent No.: US 10,673,855 B2
(45) Date of Patent: Jun. 2, 2020

(54) CONSOLIDATED IDENTITY MANAGEMENT SYSTEM PROVISIONING TO MANAGE ACCESS ACROSS LANDSCAPES

(71) Applicant: SAP SE, Walldorf (DE)

(72) Inventors: Neha Garg, Bangalore (IN); Suman Kumar Puthadi, Bangalore (IN)

(73) Assignee: SAP SE, Walldorf (DE)

( * ) Notice: Subject to any disclaimer, the term of this patent is extended or adjusted under 35 U.S.C. 154(b) by 256 days.

(21) Appl. No.: 15/949,600

(22) Filed: Apr. 10, 2018

(65) Prior Publication Data

US 2019/0312870 A1 Oct. 10, 2019

(51) Int. Cl.
*H04L 29/06* (2006.01)
*G06Q 50/26* (2012.01)
*G06F 9/54* (2006.01)
*G06Q 10/10* (2012.01)

(52) U.S. Cl.
CPC .............. *H04L 63/10* (2013.01); *G06F 9/547* (2013.01); *G06Q 50/265* (2013.01); *H04L 63/1433* (2013.01); *H04L 63/20* (2013.01); *G06Q 10/1053* (2013.01)

(58) Field of Classification Search
CPC ...... H04L 63/10; H04L 63/20; H04L 63/1433
See application file for complete search history.

(56) References Cited

U.S. PATENT DOCUMENTS

| 8,156,537 | B2 | 4/2012 | Gomez | |
|---|---|---|---|---|
| 8,935,742 | B2 | 1/2015 | Nice | |
| 9,639,594 | B2 | 5/2017 | Kling | |
| 2011/0087766 | A1* | 4/2011 | Kuo | G06Q 50/10 709/224 |
| 2012/0216243 | A1* | 8/2012 | Gill | G06F 21/55 726/1 |
| 2014/0149540 | A1 | 5/2014 | Mankala | |
| 2014/0244721 | A1* | 8/2014 | Taine | H04L 65/40 709/203 |
| 2015/0193709 | A1* | 7/2015 | Ramesh Babu | G06Q 30/00 705/7.28 |
| 2017/0180403 | A1 | 6/2017 | Mehta | |
| 2017/0244613 | A1 | 8/2017 | Vasudevan | |

* cited by examiner

*Primary Examiner* — Dao Q Ho
(74) *Attorney, Agent, or Firm* — Fish & Richardson P.C.

(57) ABSTRACT

In a process of consolidated identity management system provisioning to manage access across landscapes, a request is received to provision an entity in one or more heterogeneous landscapes. The request includes one or more sub-requests. Upon determining that the one or more heterogeneous landscapes corresponding to the one or more sub-request is connected to a central IDM system, the entity in the one or more heterogeneous landscapes is provisioned via the central IDM system. The status of the one or more sub-requests is determined using a push pull mechanism at the central IDM system. Upon determining that the one or more heterogeneous landscapes corresponding to the one or more sub-requests is not connected to the central IDM system, the entity is directly provisioned in the one or more heterogeneous landscapes. The request is closed after receiving the status update from the individual one or more sub-requests.

16 Claims, 11 Drawing Sheets

| PROCESS: | ACCESS REQUEST APPROVAL WORKFLOW 302 |
|---|---|

MAINTAIN PATHS

[ADD] [MODIFY] [DELETE]

| PATH ID | PATH DESCRIPTION |
|---|---|
| CREATE PATH 304 | CREATE USER PATH 306 |

MAINTAIN STAGES

[ADD] [MODIFY] [DELETE] [DISPLAY TASK SETTINGS] [NOTIFICATION SETTINGS]

| STAGE SEQ. NO. | STAGE CONFIG ID | STAGE DESCRIPTION | AGENT ID | APPROVAL TYPE | ROUT.. |
|---|---|---|---|---|---|
| 001 308 | GRAC_MANAGER | STAGE1-CREATE USER | MANAGER 310 | ANY ONE APPROVER | NO |
| 002 | GRAC_ROLE_MANAGER | STAGE2-CREATE USER | ROLE OWNER 312 | ANY ONE APPROVER | NO |

FIG. 3

| DIALOG STRUCTURE | IDM GLOBAL DISTRIBUTION 402 | | |
|---|---|---|---|
| ⇨ IDM GLOBAL DISTRIBUTION | | IDM PARENT CONNECTOR | ACTIVE |
| ☐ IDM MODEL DISTRIBUTION | ☐ | IDM_NW | ✓ 404 |
| | ☐ | | |

| DIALOG STRUCTURE | IDM MODEL DISTRIBUTION 406 | | |
|---|---|---|---|
| ☐ IDM GLOBAL DISTRIBUTION | | TARGET CONNECTOR | IDM – CHILD CONNECTOR |
| ⇨ IDM MODEL DISTRIBUTION | ☐ | IDM_NW | GH6CLIENT600 408 |
| | ☐ | IDM2_NW | GH7CLIENT600 410 |
| | ☐ | | |

FIG. 4A

CONFIGURATION OF RFC CONNECTIONS

| RFC CONNECTIONS | TYPE | PL A.. | COMMENT |
|---|---|---|---|
| ▶ ABAP CONNECTIONS | 3 | | |
| ▼ HTTP CONNECTIONS TO EXTERNAL SERVER | G | | |
|     IAG_SOD_QA | G | | IAG SOD SERVICE FROM ACMEQA |
|     IDM_NW 412 | G | | IDM_NW – IDM GRC INTEGRATION |
|     NW_IDM72 | G | | CONNECTOR FOR DEPLOYED VDS |

RFC DESTINATION IDM_NW 414
CONNECTION TEST

RFC DESTINATION: IDM_NW
CONNECTION TYPE: G

DESCRIPTION

DESCRIPTION 1:
DESCRIPTION 2:

[ ADMINISTRATION | TECHNICAL SETTING 416 | LOGON & SECURITY ]

TARGET SYSTEM SETTINGS

| HOST | ABC | PORT | 50000 |
|---|---|---|---|
| PATH PREFIX | /IDMRESTAPI/V2/SERVICE/ | | |

HTTP PROXY OPTIONS

GLOBAL CONFIGURATION

PROXY HOST:
PROXY SERVICE:

FIG. 4B

ACCESS REQUEST 502

REQUESTOR  XYZ 506

REASON FOR REQUEST

REQUEST DETAILS

*DESCRIPTION:

*REQUEST TYPE:  NEW ACCOUNT ∨

*REQUEST FOR:  OTHER ∨

*USER:  ABC 504 ∨

PRIORITY:  MEDIUM ∨

BUSINESS PROCESS:  BIZ A ∨

FUNCTIONAL AREA:  FNC A ∨

DUE DATE:  13-04-2018 ∨

USER ACCESS  RISK VIOLATION  ATTACHMENTS  USER DETAILS  PARAMETERS  USER GROUPS  USER SYSTEM DETAILS  CUSTOM DATA

↗ 508

| ADD ∨ | REMOVE | EXISTING ASSIGNMENTS | | | | | | | |
|---|---|---|---|---|---|---|---|---|---|
| | ASSIGNMENT | SYSTEM | TYPE | VALID FROM | VALID TO | ASSIGN | DESCRIPTION | COMMENTS | PROVISIONING ACT.. |
| ▨ | GH7CLIENT600 | GH7CLIENT600 | SYSTEM | 07.02.2018 | 31.12.2030 | | GH7CLIENT600 | ADD COMMENTS | CREATE USER |
| ▨ | ZFI_AR_ER | GH7CLIENT600 | SINGLE ROLE | 07.02.2018 | 31.12.2030 | | | ADD COMMENTS | ASSIGN |
| ☐ | ZFI_005_DUB | GH7CLIENT600 | DERIVED ROLE | 07.02.2018 | 31.12.2030 | | | ADD COMMENTS | ASSIGN |

FIG. 5

| Audit Log 802 | Time stamp | Updated |
|---|---|---|
| Request 358 of type New Account submitted by User A | 23.01.2018, 10:19:08 | User A |
| Role Z.FI_AR_ER added to request for GH7CLIENT600 for action 'Assign' with validity 07.02.2018-31.12.2030 | 23.01.2018, 10:19:08 | User A |
| GH7CLIENT600 system added to user in request for action 'create user' with validity 07.02.2018-31.12.2030 | 23.01.2018, 10:19:08 | User A |
| Account validation is ignored for system GH7CLIENT600 due to conflicting actions | 23.01.2018, 10:19:08 | User A |
| Request is pending for approval at path DEFAULT_PATH stage GRAC_MANAGER | 23.01.2018, 10:19:08 | Workflow System |
| Administrator user A is performing actions at path DEFAULT_PATH and stage GRAC_MANAGER | 23.01.2018, 10:19:08 | User A |
| Role Z.FI_AR_ER in system GH7CLIENT600 is approved for action 'Assign' with validity 07.02.2018-31.12.2030 | 23.01.2018, 10:19:08 | User A |
| System GH7CLIENT600 is approved for action 'create user' with validity 07.02.2018-31.12.2030  804 | 23.01.2018, 10:19:49 | User A |
| Request is pending for approval at path DEFAULT_PATH stage GRAC_ROLEOWNER | 23.01.2018, 10:19:53 | Workflow System |
| Administrator user B is performing actions at path DEFAULT_PATH and stage GRAC_ROLEOWNER | 23.01.2018, 10:19:53 | User A |
| System GH7CLIENT600 is approved for action 'create user' with validity 07.02.2018-31.12.2030 | 23.01.2018, 10:20:27 | User A |
| Auto provisioning activity at end of request | | |
| New user: created in system GH7CLIENT600 | 23.01.2018, 10:19:08 | Workflow System |
| Approval path processing is finished, end of path reached | 23.01.2018, 10:19:08 | Workflow System |

FIG. 8

CONSOLIDATED IDENTITY MANAGEMENT SYSTEM PROVISIONING TO MANAGE ACCESS ACROSS LANDSCAPES

BACKGROUND

Enterprises deal periodically with personnel changes such as new hiring of employees, termination of employees, role change of employees, etc. Typically, enterprises use identity management solutions to provision employees or users to applications. Identity management has various features such as management of user information, passwords, workflows, provisioning and de-provisioning of identities from resources. An access control application may integrate with an identity management solution to enforce governance, minimize risks and enforce compliance in an enterprise. Access control helps define policies and rules for granting access to resources, and the integration between the access control and the identity management ensures that user provisioning does not contain risk violations when granting user access. Various systems of different connection types such as vendor system, customer system, etc., may be available at the enterprise for provisioning. If such systems are connected to the access control application, they may be provisioned directly. However, when such systems are connected to the identity management systems, it is challenging for the access control system to provision these systems via the identity management system.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 3 is a user interface illustrating an exemplary workflow for provisioning an employee in a heterogeneous landscape, according to one embodiment.

FIG. 4A illustrates a set of user interface screens illustrating connector configuration in a central IDM system, according to one embodiment.

FIG. 4B illustrates a set of user interface screens illustrating configuration of a central IDM system, according to one embodiment.

FIG. 5 is a user interface screen illustrating an access request, according to one embodiment.

FIG. 8 illustrates a user interface screen illustrating audit log of an access request, according to one embodiment.

DETAILED DESCRIPTION

Embodiments of techniques of consolidated identity management system provisioning to manage access across landscapes are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
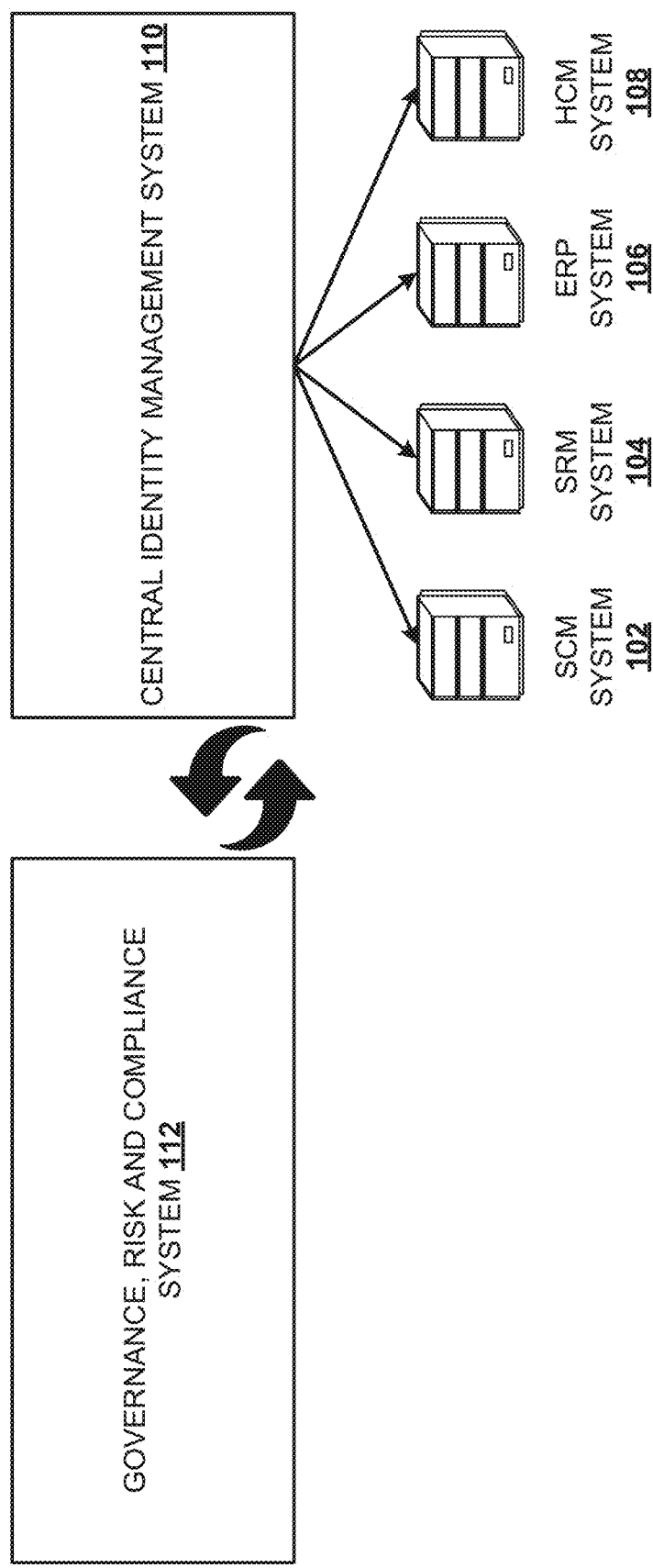
FIG. 1 is a block diagram illustrating an environment for consolidated identity management system provisioning to manage access across landscapes, according to one embodiment.

FIG. 1 is a block diagram illustrating an environment for consolidated identity management system provisioning to manage access across landscapes, according to one embodiment. A landscape or system landscape consists of a number of hardware and software components that depend on each other with regard to installation, software updates, and demands on interfaces. Typical IT infrastructure includes heterogeneous landscapes such as supply chain management systems (SCM) 102, supplier relationship management systems (SRM) 104, enterprise resource planning systems (ERP) 106, human capital management systems (HCM) 108, etc. The heterogeneous landscape systems may be connected to central identity management system (IDM) 110. The central IDM system 110 is the provisioning system responsible for provisioning in the target heterogeneous landscape systems. Governance, risk and compliance (GRC) system 112 enables enterprises to manage regulations and compliance and remove any risk. This includes access control, fraud management, and risk management to be performed in the heterogeneous landscape systems. The GRC system 112 may provision the heterogeneous landscape systems that are directly connected to it, whereas for the heterogeneous landscape systems that are connected to the central IDM system 110, the GRC system 112 may provision via the central IDM system 110.

Figure 2:
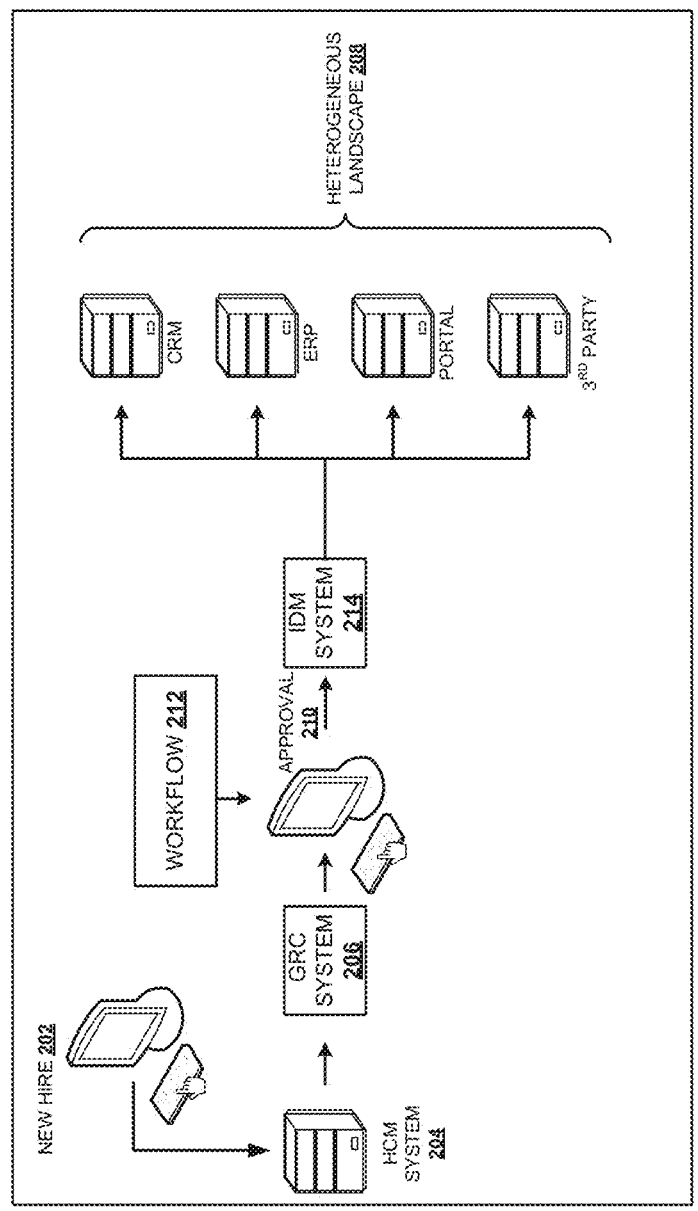
FIG. 2 is a block diagram illustrating an exemplary use case for provisioning an employee in a heterogeneous landscape, according to one embodiment.

FIG. 2 is a block diagram illustrating an exemplary use case for provisioning employees in a heterogeneous landscape, according to one embodiment. When a new employee is hired 202 in an enterprise, the employee details are input in HCM system 204 or any enterprise application such as R/3 system. An access request is created from GRC system 206 to provision the employee in the heterogeneous landscape 208. The approval 210 for the employee provisioning is performed based on the number or levels of approvers configured. Workflow 212 with various levels and stages of approval may be provided to the approval 210 for the employee provisioning. GRC system 206 provisions the employee in the heterogeneous landscape 208 via identity management system (IDM) 214. After successful approval of the provisioning request, the new employee is provisioned in the heterogeneous landscape 208.

FIG. 3 is a user interface illustrating an exemplary workflow for provisioning an employee in a heterogeneous landscape, according to one embodiment. While provisioning the employee in the heterogeneous landscape an approval process may be involved that includes various levels of approvals from manager, line of business head, etc. Depending on the role and designation of the employee, the permission level, the approval levels may vary. The provisioning request is represented in the form of an access request approval workflow 302. Access request approval workflow 302 can be configured with various paths and stages. Multi state multi path (MSMP) workflow engine is a configurable layer provided for access control. This provides flexibility to enable a single request to be split and routed to different approvers in parallel as well as multiple approval steps depending on the business requirement. Depending on the request multiple paths are defined, for example, a different path may be defined for each request type such as new path, change path, etc. For example, to create a user, create path 304 is configured in the access request approval workflow 302 with description as create user path 306. Any number of path may be configured for an access request. Within the individual path, stages may be defined for individual approval level. The stage can then be configured to determine screen layout, stage configuration ID, stage description, approval type, routing of request, escalation, notification, etc. A path with no stage will trigger automatic approval. For example, for the create user path, multiple approval stages are defined such as stage sequence number '001' 308 is created with stage 1 approval from agent ID manager 310, and stage 2 approval from agent ID role owner 312. Any number of stages can be configured with the parameters. Once the workflow is created and activated, and a new request to provision the employee comes in, the request follows the workflow created.

FIG. 4A illustrates a set of user interface screens illustrating a connector configuration in a central IDM system, according to one embodiment. In the connector configuration for the central IDM system, the provision settings for the central IDM system is configured. Two types of configurations settings can be performed in the connector configuration. If provisioning needs to be routed through a single central IDM system to a landscape the configuration setting or mapping is specified under IDM global distribution setting as shown in 402. For example, in the IDM global distribution setting, the target connector is specified with a central IDM system such as 'IDM_NW' and the landscape such as 'GH7CLIENT500' as shown in 404. The landscape 'GH7CLIENT500' is connected to the single central IDM system e.g. 'IDM_NW'. If provisioning needs to be routed through multiple different central IDM systems to a landscape the configuration setting or mapping is specified under IDM model distribution setting as shown in 406. For example, in the IDM model distribution setting, the target connector is specified with a central IDM system such as 'IDM_NW' and the landscape such as 'GH6CLIENT600' as shown in 408. The target connector is specified with a central IDM system such as 'IDM2_NW' and the landscape such as 'GH7CLIENT600' as shown in 410. The landscape 'GH6CLIENT600' is connected to multiple central IDM systems e.g. 'IDM_NW' and 'IDM2_NW'.

FIG. 4B illustrates a set of user interface screens illustrating configuration of a central IDM system, according to one embodiment. The central IDM system may be configured as remote function call (RFC) connections. For example, IDM_NW system 412 is configured as RFC connections. Heterogeneous landscape systems connected to the IDM_NW system 412 are also configured in the similar way. The IDM_NW system 412 may be configured as shown in RFC destination IDM_NW 414. RFC destination, connection type, description and other technical system settings are configured as shown in the RFC destination IDM_NW 414. Technical setting 416 includes configuring host name, port, path and HTTP proxy options to enable RFC connection establishment. The heterogeneous landscape systems are connected to the IDM_NW system 412 using RFC enable function calls over hypertext transfer protocol (HTTP) connection.

FIG. 5 is a user interface screen illustrating an access request, according to one embodiment. Access request 502 is created for provisioning a new employee by creating a new account for user 'ABC' 504. Requestor 'XYZ' 506 is shown creating the new account request by specifying a reason for request, request type as 'new account', request for 'other', priority as 'medium', business process as 'BIZ A', functional area as 'FNC A' and due date as '13-04-2018'. The new account may be provisioned in a heterogeneous landscape. The sub-requests are created in the request that correspond to the provisioning be made in the respective landscape system. Sub-request 508 is created for provisioning the new account for user 'ABC' 504 in the landscape system 'GH7CLIENT600'. The configuration parameters associated with the sub-request include the validity of the account indicated by a valid from and a valid to parameter. Provisioning environment is specified as 'production', provisioning action as 'create user' and provisioning status as 'not processed'. Any number of sub-requests may be included to create the new account in various systems in the landscape.

Figure 6:
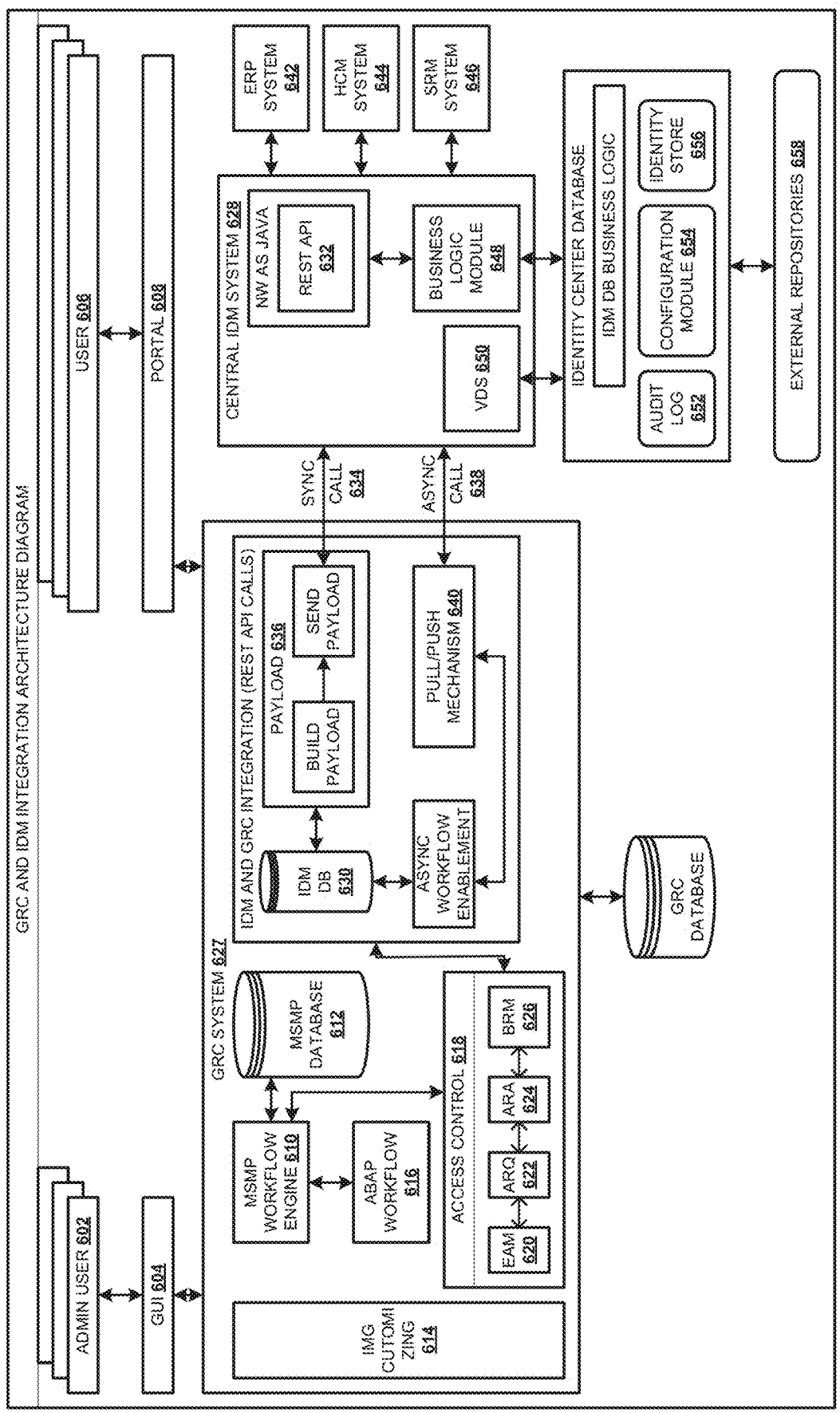
FIG. 6 is a block diagram illustrating architecture for consolidated identity management system provisioning to manage access across landscapes, according to one embodiment.

FIG. 6 is a block diagram illustrating architecture for consolidated identity management system provisioning to manage access across landscapes, according to one embodiment. Admin user 602 may logon using GUI 604 to perform administrator tasks such as managing access request, managing access risks, maintaining roles, and performing emergency access. Business user or end user 606 may logon using portal 608 to perform non-administrative provisioning tasks such as creating access requests, managing your password, etc. Multi state multi path (MSMP) workflow engine 610 is a configurable layer provided for access control. This provides flexibility to enable a single request to be split and routed to different approvers in parallel as well as multiple approval steps depending on the business requirement. For example, for a single request, the approval workflow may have single approver or multiple approvers depending on the requirement. The MSMP database 612 is a common database that holds the information being processed by the MSMP workflow engine 610. Image (IMG) customizing 614 is used to customize access request and approval screens based on the business requirement.

Advanced business application programming (ABAP) workflow 616 facilitates and automates business processes as tasks, for example, create user workflow. Access control 618 provides a standardized and centralized framework to request user access and to review and manage those requests. Access control includes various modules such as emergency access management (EAM) 620 that allows grant and review of temporary access or privilege without introducing risk. Access request (ARQ) 622 deals with managing the request, access available for the request and risk analysis associated with the request. Access risk analysis (ARA) 624 helps evaluate systems for access risks across users, roles, organization levels, etc. An access risk is an action or permission that when available to a user or role creates the possibility of error. Monitoring and controlling role design within the business systems is performed through business role management (BRM) 626. Role is created through this model. To create an access, request the following sequence of steps are performed such as creating a role, creating a rule for risk analysis, creating a super user access and then creating the access request.

Identity management (IDM) request sent to a central IDM system 628 will be held in the IDM database (DB) 630. IDM provisioning request is received via REpresentational State Transfer Application programming interface (REST API) 632 through payloads. Initially when a connection is established between a GRC system and the central IDM system 628, a token is sent to the central IDM system 628 to test the established connection. If a response is received for the token it is inferred that the connection is successfully established between the GRC system 627 and the central IDM system 628. IDM connector settings may be configured in the central IDM system 628 as explained in FIG. 4A. For example, a heterogeneous landscape may or may not be connected to the central IDM system 628. In the IDM connector configuration in the central IDM system 628, a connector is specified for the heterogeneous landscape. The IDM connector configuration holds the information if the heterogeneous landscape is connected to the central IDM system 628 or not.

A request is received from the GRC system 627 to provision an entity e.g. employee in a heterogeneous landscape, and the request may include sub-requests. It is determined whether the individual sub-request is enabled or not enabled for IDM. Upon determining that the individual sub-request corresponding to the heterogeneous landscape is not enabled for IDM, a direct provisioning of the entity is performed in the heterogeneous landscape. Upon determining that the individual sub-request corresponding to the heterogeneous landscape is enabled for IDM, payload 636 is built for the REST API call. The payload 636 is sent to the central IDM system 628 for provisioning. If the configuration of the sub-request corresponding to the heterogeneous landscape and the central IDM system supports immediate provisioning, the payload 636 is sent as a synchronous REST API request 634 to the central IDM system 628.

If the configuration of the sub-request corresponding to a landscape and the central IDM system 628 does not support immediate provisioning, the payload 636 is sent as an asynchronous REST API request 638 to the central IDM system 628. Various types of payload may be created/built for create user, change user, remove user etc. If the payload is sent as an asynchronous REST API request 638 to the central IDM system 628, status of the individual sub-request is checked in the central IDM system using the push pull mechanism 640. Heterogeneous landscape systems such as the ERP system 642, the HCM system 644 and the SRM system 646 are shown connected to the central IDM system 628. Provisioning is performed in these heterogeneous landscapes by the GRC via the central IDM system 628.

The business logic module 648 is used to evaluate the logic of the workflow. Virtual data source (VDS) 650 is an interface for data access. VDS 650 determines the data source corresponding to the requested data, and fetches data from that source and provides it to the requesting system. Audit log 652 stores the audit of the events in the GRC and IDM integration components. Configuration such as whether the task is to be immediately performed or queued for later execution is stored in the configuration module 654. Identity store 656 is used to store the actual users. Information in the audit log 652, the configuration module 654 and the identity store 656 are stored in the external repositories 658.

Figure 7:
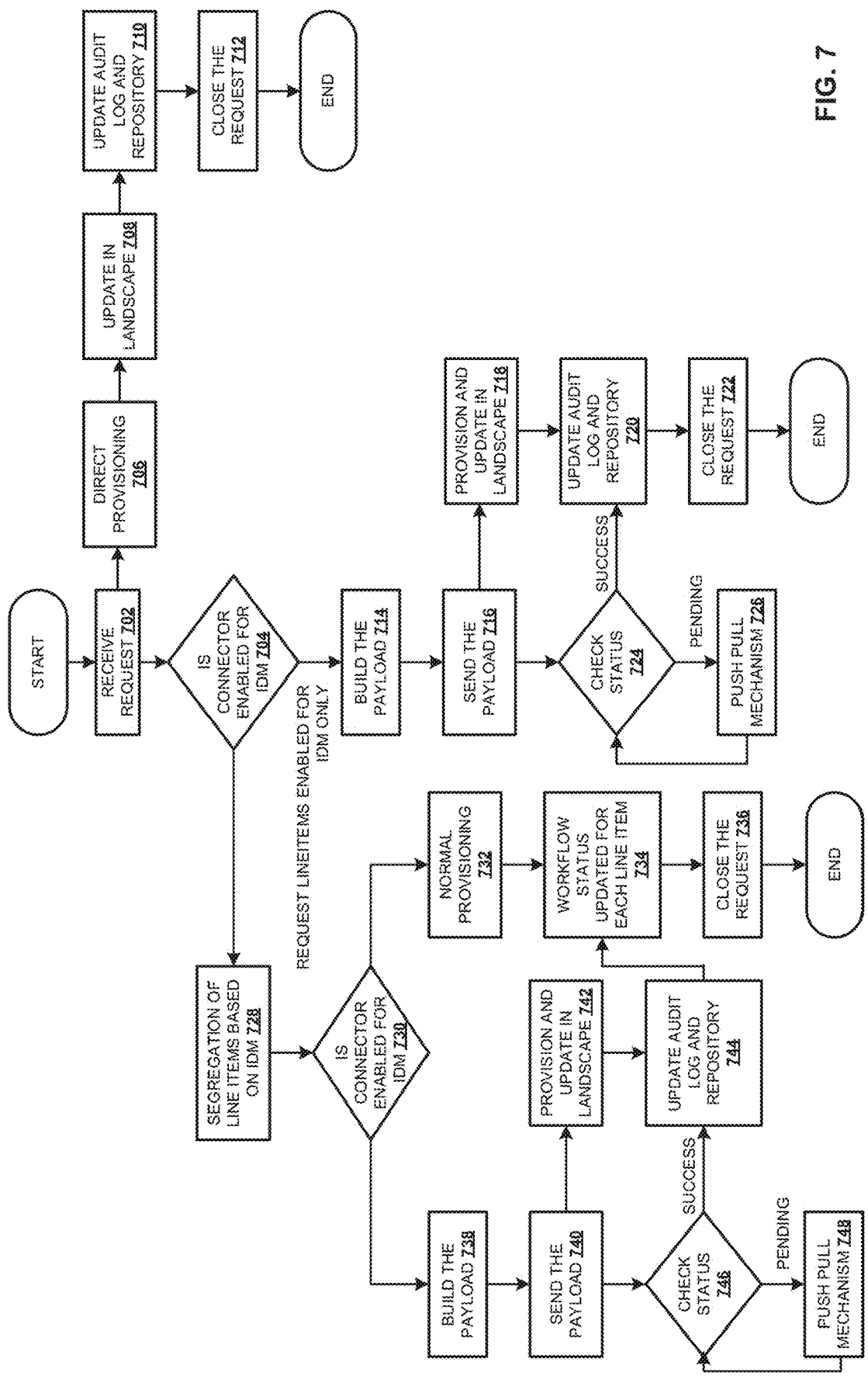
FIG. 7 is a flow diagram illustrating consolidated identity management system provisioning to manage access across landscape, according to one embodiment.

FIG. 7 is a flow diagram illustrating the consolidated identity management system provisioning to manage access across landscape, according to one embodiment. A request is created from the GRC system for example, a request to provision a user may be created from the GRC system. The creation of user workflow may be configured in a MSMP where path and state can be configured. For example, create user workflow can be configured in MSMP workflow with create path and one approval stage such as manager approval. At 702, a request is received from the GRC system. The request may include sub-requests, for example, the request to provision user may include sub-requests such as provisioning in heterogeneous landscape. For example, the request to provision user may include a sub-request to provision the user in a SRM system and another sub-request to provision the user in an ERP system.

At 704, it is determined whether the individual sub-request is enabled or not enabled for a central IDM. Upon determining that the individual sub-request corresponding to a landscape is not enabled for the central IDM. At 706, a direct provisioning of user is performed in the landscape. For example, the individual sub-request corresponding to ERP system landscape may be directly connected to the GRC system and not the central IDM system. In this scenario, the individual sub-request corresponding to ERP system landscape is not enabled for the central IDM, and hence the user is directly provisioned in the ERP system. At 708, the provisioned information is updated in the landscape e.g. ERP system. At 710, the activities corresponding to the user provisioning is updated in an audit log and a repository. At 712, the creation of the user workflow is updated with the provisioned information and the request is closed.

Upon determining that the individual sub-request corresponding to a landscape is enabled completely for the central IDM. At 714, a payload is built for the REST API calls. In this scenario, the individual sub-requests corresponding to the landscapes are completely enabled for the central IDM and there is no sub-request that is not enabled for the central IDM. At 716, the payload is sent to the central IDM system for provisioning. If the IDM configuration supports immediate provisioning, the payload is sent as a synchronous REST API to the central IDM system. If the configuration of the sub-request corresponding to a landscape and the central IDM system does not support immediate provisioning, the payload is sent as an asynchronous REST API to the IDM system. At 718, if the payload is sent as the synchronous REST API to the central IDM system, the user is immediately provisioned and updated in the landscape.

At 720, the activities corresponding to the user provisioning is updated in an audit log and a repository. At 722, the creation of the user workflow is updated with the provisioned information and the request is closed. If the payload is sent as an asynchronous REST API to the central IDM system. At 724, status of the individual sub-request is checked in the IDM system using the push pull mechanism. At 726, the push pull mechanism is executed as a background job to get the status of the individual sub-request from the central IDM system. The request to check the status is pushed to the central IDM system, and the response from the IDM system is pulled from the central IDM system. At 724, if the checked status is successful, at 720, the activities corresponding to the user provisioning is updated in an audit log and a repository. At 722, the creation of user workflow is updated with the provisioned information and the request is closed.

At 704, upon determining that the individual sub-request corresponding to a landscape is enabled partially for the central IDM, at 728, the sub-requests corresponding to the landscapes that are enabled for the central IDM and not enabled for the central IDM are segregated. In a scenario where some of the sub-requests corresponding to the landscapes are enabled for IDM and some of the sub-requests are not enabled for the central IDM, it is inferred to be a hybrid model. At 730, it is determined whether the individual sub-request is enabled or not enabled for the central IDM. Upon determining that the individual sub-request corresponding to a landscape is not enabled for IDM, at 732, a direct provisioning of user is performed in the landscape, and the activities corresponding to the user provisioning is updated in an audit log and a repository. At 734, the creation of user workflow is updated with the provisioned information. At 736, when the status is received for all sub-requests, the request is closed.

Upon determining that the individual sub-request corresponding to a landscape is enabled for IDM, at 738, a payload is built for the REST API calls. At 740, the payload is sent to the IDM system for provisioning. If the configuration of the sub-request corresponding to the landscape and the central IDM system supports immediate provisioning, the payload is sent as a synchronous REST API to the central IDM system. If the configuration of the sub-request corresponding to a landscape and the central IDM system does not support immediate provisioning, the payload is sent as an asynchronous REST API to the central IDM system. At 742, if the payload is sent as the synchronous REST API to the central IDM system, the user is immediately provisioned and updated in the landscape. At 744, the activities corresponding to the user provisioning is updated in an audit log and a repository. At 734, the creation of user workflow is updated with the provisioned information. At 736, when the status is received for all sub-requests, the request is closed.

If the payload is sent as an asynchronous REST API to the central IDM system, at 746, status of the individual sub-request is checked in the central IDM system using the push pull mechanism. At 748, the push pull mechanism is executed as a background job to get the status of the individual sub-request from the central IDM system. The request to check the status is pushed to the central IDM system, and the response from the central IDM system is pulled from the central IDM system. At 746, if the checked status is successful, at 720, the activities corresponding to the user provisioning is updated in an audit log and a repository. At 734, the creation of user workflow is updated with the provisioned information. At 736, when the status is received for the sub-requests, the request is closed.

FIG. 8 illustrates a user interface screen illustrating audit log of an access request, according to one embodiment. With reference to the access request explained in FIG. 5 and the flow diagram illustrating system provisioning explained in FIG. 7, the result of processing the access request is stored in an audit log 802. The audit log 802 shows the details of activities performed for the access request. After the submission of access request, depending on the type of connector configured, the provisioning workflow is executed. After completion of provisioning, the audit logs are updated. For example, the audit log entry 804 'system GH7client600 is approved for action 'create user' with validity 07.02.2018 to 31.12.2030' with timestamp '07.02.2018 11:02:06' and updated by user A.

Figure 9:
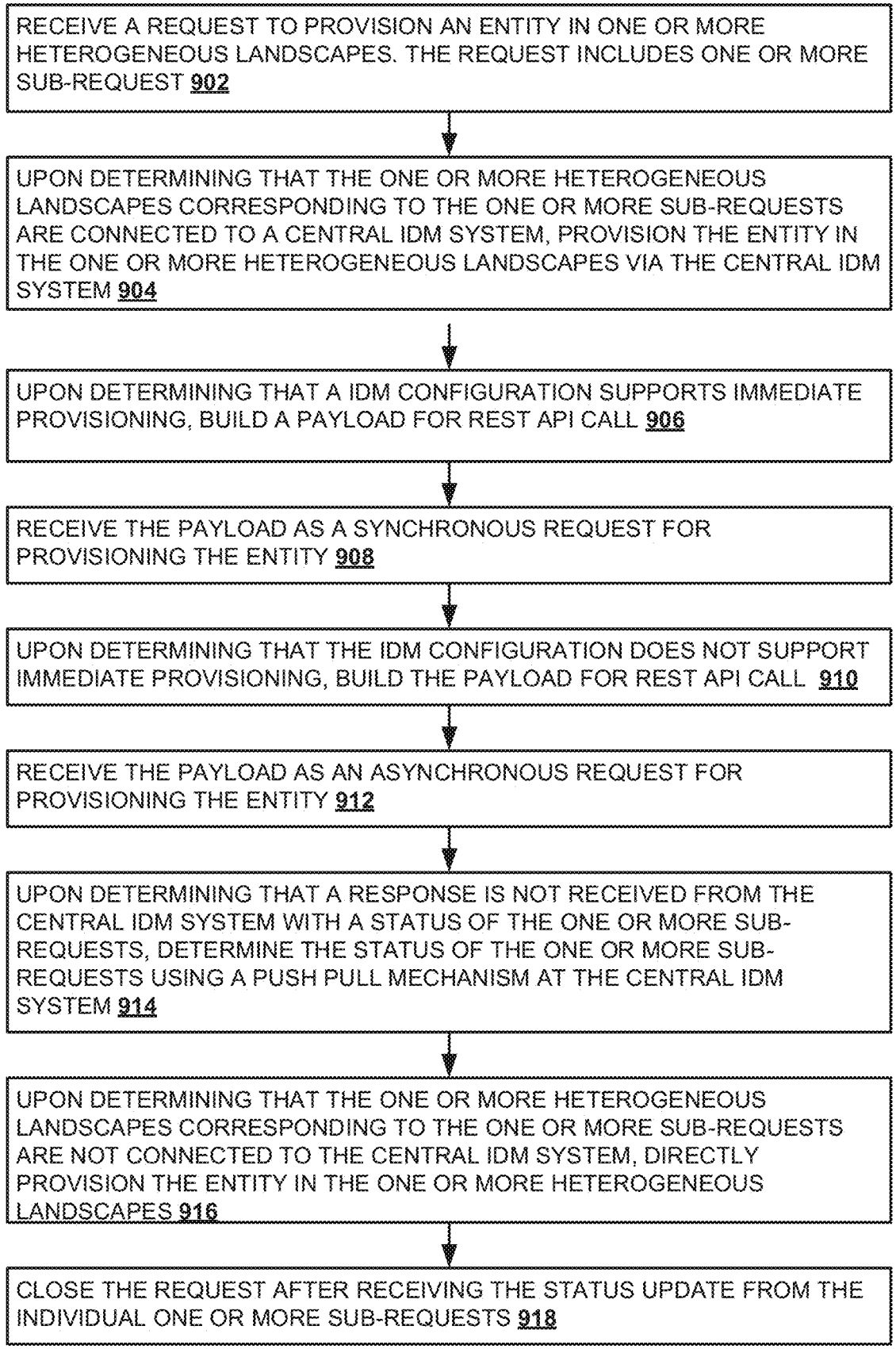
FIG. 9 is a flow chart illustrating a process of consolidated identity management system provisioning to manage access across landscapes, according to one embodiment.

FIG. 9 is a flow chart illustrating a process of consolidated identity management system provisioning to manage access across landscapes, according to one embodiment. At 902, a request is received to provision an entity in one or more heterogeneous landscapes. The request includes one or more sub-requests. At 904, upon determining that the one or more heterogeneous landscapes corresponding to the one or more sub-requests are connected to a central IDM system, the entity in the one or more heterogeneous landscapes is provisioned via the central IDM system. At 906, upon determining that a IDM configuration supports immediate provisioning, a payload is built for REST API call. At 908, the payload is received as a synchronous request for provisioning the entity. At 910, upon determining that the IDM configuration does not support immediate provisioning, the payload is built for REST API call. At 912, the payload is received as an asynchronous request for provisioning the entity. At 914, upon determining that a response is not received from the central IDM system with a status of the one or more sub-requests, the status of the one or more sub-requests are determined using a push pull mechanism at the central IDM system. At 916, upon determining that the one or more heterogeneous landscapes corresponding to the one or more sub-requests are not connected to the central IDM system, the entity is directly provisioned in the one or more heterogeneous landscape. At 918, The request is closed after receiving the status update from the individual one or more sub-request.

The embodiments described above have the advantages stated below. Asynchronous provisioning process using the push pull mechanism optimizes load on both the GRC system and the central IDM system, since the frequency of polling can be configured. If the provisioning is successful a status update is received as a response from the IDM central system. Any number of heterogeneous landscape systems can be provisioned by improving time and network efficiency. Earlier only the synchronous provisioning process was supported from the access control to the central IDM system, and the IDM driven system level approach was not possible. With the embodiments described above, the access driven provisioning can be achieved for different types of landscapes connected to the central IDM system. In most of the customer business scenarios, the system landscapes are managed via the central IDM system and hence the embodiments described above enables direct provisioning of the landscape systems connected with the central IDM system the GRC system.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
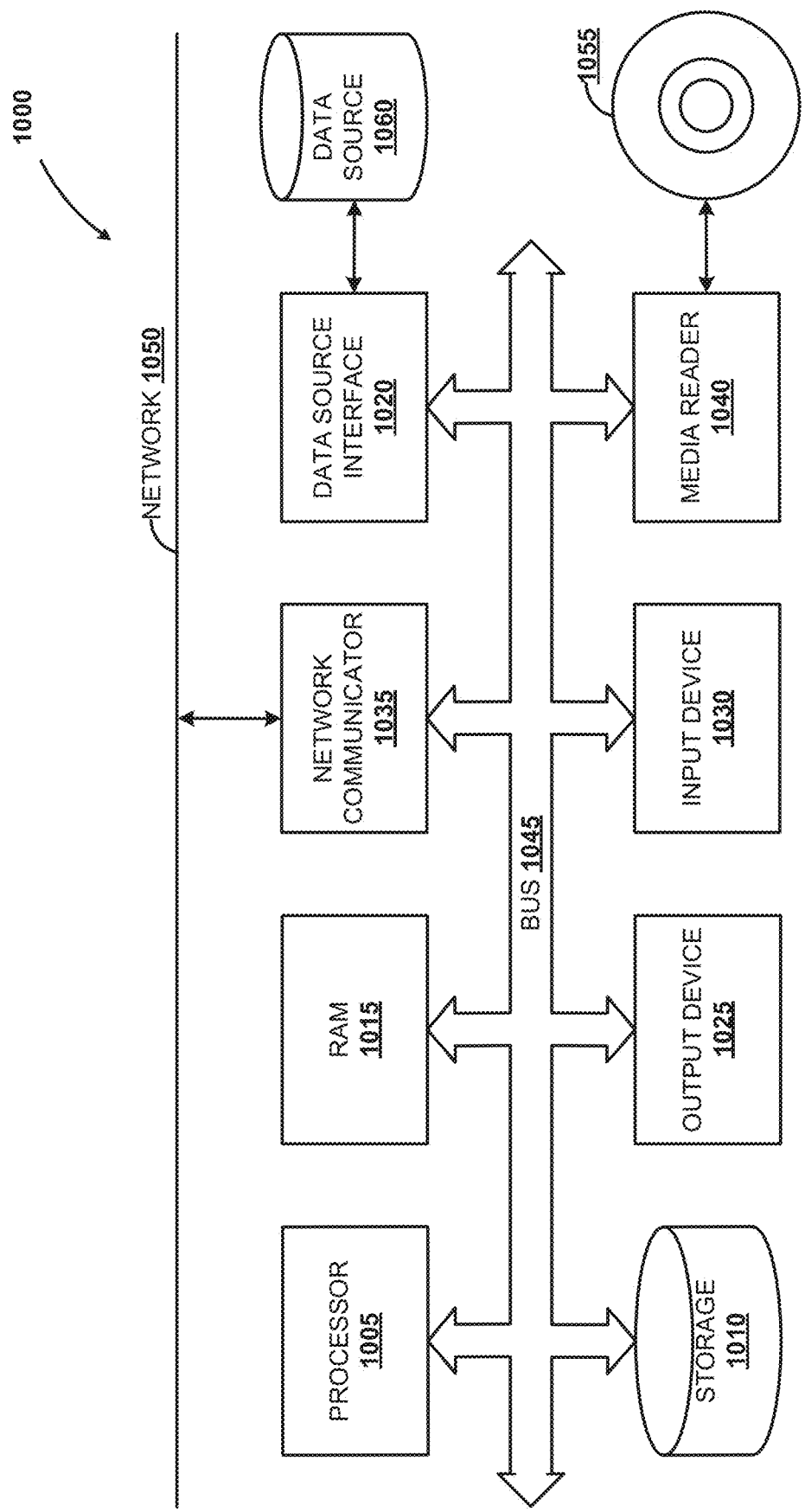
FIG. 10 is a block diagram of an exemplary computer system, according to one embodiment.

FIG. 10 is a block diagram of an exemplary computer system 1000. The computer system 1000 includes a processor 1005 that executes software instructions or code stored on a computer readable storage medium 1055 to perform the above-illustrated methods. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object-oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
receive a request to provision an entity in one or more heterogeneous landscapes, wherein the request includes one or more sub-requests;
upon determining that the one or more heterogeneous landscapes corresponding to the one or more sub-requests are connected to a central identity management (IDM) system, provision the entity in the one or more heterogeneous landscapes via the central IDM system;
upon determining that the one or more heterogeneous landscapes corresponding to the one or more sub-requests are not connected to the central IDM system, directly provision the entity in the one or more heterogeneous landscapes;

upon determining that an IDM configuration supports immediate provisioning, receive a payload as a synchronous request for provisioning the entity, wherein the payload is built for representational state transfer (REST) application programming interface (API) call;

upon determining that the IDM configuration does not support immediate provisioning, receive a payload as an asynchronous request for provisioning the entity, wherein the payload is built for representational state transfer (REST) application programming interface (API) call;

upon determining that a response is not received from the central IDM system with a status of the one or more sub-requests, determine the status of the one or more sub-requests from the central IDM system;

upon receiving a response from the central IDM system with the status of the one or more sub-requests, update the status in an audit log;

update a workflow corresponding to provisioning the entity; and close the request after receiving status update from the individual one or more sub-requests.

2. The computer-readable medium of claim 1, wherein determining the status of the one or more sub-requests at the central IDM system comprises determining the status of the one or more sub-requests at the central IDM system using a push pull mechanism at the central IDM system.

3. The computer-readable medium of claim 1, further comprises instructions which when executed by the computer further cause the computer to:

receive a new request to provision the entity in the one or more heterogeneous landscapes;

upon determining that the one or more heterogeneous landscapes corresponding to the request are connected to a central IDM system, provision the entity in the one or more heterogeneous landscapes via the central IDM system; and close the request after receiving status update from the request.

4. The computer-readable medium of claim 1, wherein determining whether the one or more heterogeneous landscapes corresponding to the one or more sub-requests is connected to a central IDM system depends on a connector configuration defined in the request.

5. The computer-readable medium of claim 1, wherein the push pull mechanism is performed as a background job at the central IDM system.

6. A computer-implemented method of consolidated identity management system provisioning to manage access across landscapes, the method comprising:

receiving a request to provision an entity in one or more heterogeneous landscapes, wherein the request includes one or more sub-requests;

upon determining that the one or more heterogeneous landscapes corresponding to the one or more sub-requests are connected to a central identity management (IDM) system, provisioning the entity in the one or more heterogeneous landscapes via the central IDM system;

upon determining that the one or more heterogeneous landscapes corresponding to the one or more sub-requests are not connected to the central IDM system, directly provisioning the entity in the one or more heterogeneous landscapes;

upon determining that an IDM configuration supports immediate provisioning, receive a payload as a synchronous request for provisioning the entity, wherein the payload is built for representational state transfer (REST) application programming interface (API) call;

upon determining that the IDM configuration does not support immediate provisioning, receive a payload as an asynchronous request for provisioning the entity, wherein the payload is built for representational state transfer (REST) application programming interface (API) call;

upon determining that a response is not received from the central IDM system with a status of the one or more sub-requests, determine the status of the one or more sub-requests from the central IDM system;

upon receiving a response from the central IDM system with the status of the one or more sub-requests, update the status in an audit log;

update a workflow corresponding to provisioning the entity; and closing the request after receiving status update from the individual one or more sub-requests.

7. The method of claim 6, wherein determining the status of the one or more sub-requests at the central IDM system comprises determining the status of the one or more sub-requests at the central IDM system using a push pull mechanism at the central IDM system.

8. The method of claim 7, wherein the push pull mechanism is performed as a background job at the central IDM system.

9. The method of claim 6, further comprising:

upon receiving a response from the central IDM system with the status of the one or more sub-requests, updating the status in an audit log; and updating a workflow corresponding to provisioning the entity.

10. The method of claim 6, further comprising:

receiving a new request to provision the entity in the one or more heterogeneous landscapes;

upon determining that the one or more heterogeneous landscapes corresponding to the request is connected to a central IDM system, provisioning the entity in the one or more heterogeneous landscapes via the central IDM system; and closing the request after receiving status update from the request.

11. The method of claim 6, wherein determining whether the one or more heterogeneous landscapes corresponding to the one or more sub-requests is connected to a central IDM system depends on a connector configuration defined in the request.

12. A computer system for consolidated identity management system provisioning to manage access across landscapes, comprising:

a computer memory to store program code; and a processor to execute the program code to:

receive a request to provision an entity in one or more heterogeneous landscapes, wherein the request includes one or more sub-requests;

upon determining that the one or more heterogeneous landscapes corresponding to the one or more sub-requests are connected to a central identity management (IDM) system, provision the entity in the one or more heterogeneous landscapes via the central IDM system;

upon determining that the one or more heterogeneous landscapes corresponding to the one or more sub-requests are not connected to the central IDM system, directly provision the entity in the one or more heterogeneous landscapes;

upon determining that an IDM configuration supports immediate provisioning, receive a payload as a synchronous request for provisioning the entity, wherein the payload is built for representational state transfer (REST) application programming interface (API) call;

upon determining that the IDM configuration does not support immediate provisioning, receive a payload as an asynchronous request for provisioning the entity, wherein the payload is built for representational state transfer (REST) application programming interface (API) call;

upon determining that a response is not received from the central IDM system with a status of the one or more sub-requests, determine the status of the one or more sub-requests from the central IDM system;

upon receiving a response from the central IDM system with the status of the one or more sub-requests, update the status in an audit log;

update a workflow corresponding to provisioning the entity; and close the request after receiving status update from the individual one or more sub-requests.

13. The system of claim 12, further comprising:

receive a new request to provision the entity in one or more heterogeneous landscapes;

upon determining that the one or more heterogeneous landscapes corresponding to the request is connected to a central IDM system, provision the entity in the one or more heterogeneous landscapes via the central IDM system; and close the request after receiving status update from the request.

14. The system of claim 12, wherein determining whether the one or more heterogeneous landscapes corresponding to the one or more sub-requests are connected to a central IDM system depends on a connector configuration defined in the request.

15. The system of claim 12, wherein determining the status of the one or more sub-requests at the central IDM system comprises determining the status of the one or more sub-requests at the central IDM system using a push pull mechanism at the central IDM system.

16. The system of claim 15, wherein the push pull mechanism is performed as a background job at the central IDM system.

* * * * *